(12) United States Patent
Kudrin et al.

(10) Patent No.: US 10,999,362 B1
(45) Date of Patent: May 4, 2021

(54) SEAMLESS SWITCHING OF TERMINAL SERVERS IN REMOTE-ACCESS COMPUTING ENVIRONMENTS

(71) Applicant: Parallels International GmbH, Schaffhausen (CH)

(72) Inventors: Maxim Kudrin, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 187 days.

(21) Appl. No.: 16/247,313

(22) Filed: Jan. 14, 2019

(51) Int. Cl.
| H04L 29/08 | (2006.01) |
| G06F 9/48 | (2006.01) |
| G06F 9/451 | (2018.01) |
| G06F 9/445 | (2018.01) |
| H04L 29/06 | (2006.01) |

(52) U.S. Cl.
CPC .......... *H04L 67/1027* (2013.01); *G06F 9/445* (2013.01); *G06F 9/452* (2018.02); *G06F 9/4856* (2013.01); *H04L 67/40* (2013.01); *H04L 67/42* (2013.01)

(58) Field of Classification Search
CPC ..... H04L 67/1027; H04L 67/42; H04L 67/40; G06F 9/445; G06F 9/452; G06F 9/4856
See application file for complete search history.

(56) References Cited

U.S. PATENT DOCUMENTS

| 8,595,192 B1* | 11/2013 | Manmohan | G06F 16/21 707/678 |
| 8,893,129 B1* | 11/2014 | Havemose | G06F 9/522 718/100 |
| 2011/0271069 A1* | 11/2011 | Manmohan | G06F 11/2028 711/163 |
| 2015/0193465 A1* | 7/2015 | Schoeffler | G06F 3/04842 707/827 |
| 2016/0132310 A1* | 5/2016 | Koushik | G06F 9/452 717/176 |
| 2018/0300116 A1* | 10/2018 | Meytin | G06F 9/45558 |

* cited by examiner

*Primary Examiner* — Soe Hlaing
(74) *Attorney, Agent, or Firm* — Rosenberg, Klein & Lee

(57) ABSTRACT

The subject matter of this specification can be implemented in, among other things, a method that includes receiving, by a host server providing a remote desktop environment to a client device, a request from the client device to execute an application, selecting a first terminal server to execute the application, initiating execution of the application on the first terminal server, determining that the application is to be transferred to a second terminal server, determining identifiers of storage locations of one or more application files that are opened by a user of the client device in relation to the application, causing execution of the application on the first terminal server to be terminated; and initiating execution of the application on the second terminal server using the identifiers of the storage locations of the one or more application files.

15 Claims, 6 Drawing Sheets

SEAMLESS SWITCHING OF TERMINAL SERVERS IN REMOTE-ACCESS COMPUTING ENVIRONMENTS

TECHNICAL FIELD

This instant specification generally relates to running applications from a client device using a remote-access computing environment. More specifically, the instant specification relates to transferring execution of applications between different remote-access terminal servers.

BACKGROUND

In a network environment, it is often advantageous for a user of a computing device to execute applications on a remote server rather than on the local device. Multiple client devices (clients) can have access to the remote server and applications installed on that server. This eliminates the need to install and upkeep separate applications on client devices, decreases administration demands and costs, and promotes uniformity of user experiences and interchangeability of client devices. Such server-based computing allows utilizing remote server's computing power and memory capabilities, which often significantly exceed resources available on client devices. Often, a client device is a "lean" (or "thin") machine, which itself performs little computing, or storage of data, with only keyboard, mouse, and graphical interface data exchanges between the lean client and the remote server device with the bulk of computing, data processing, and data storage taking place on the remote server. The applications executed on the remote server are being delivered to the client device via, for example, a remote desktop session, where the local client device communicates with the remote sever using a remote display protocol.

DETAILED DESCRIPTION

Figure 1A:
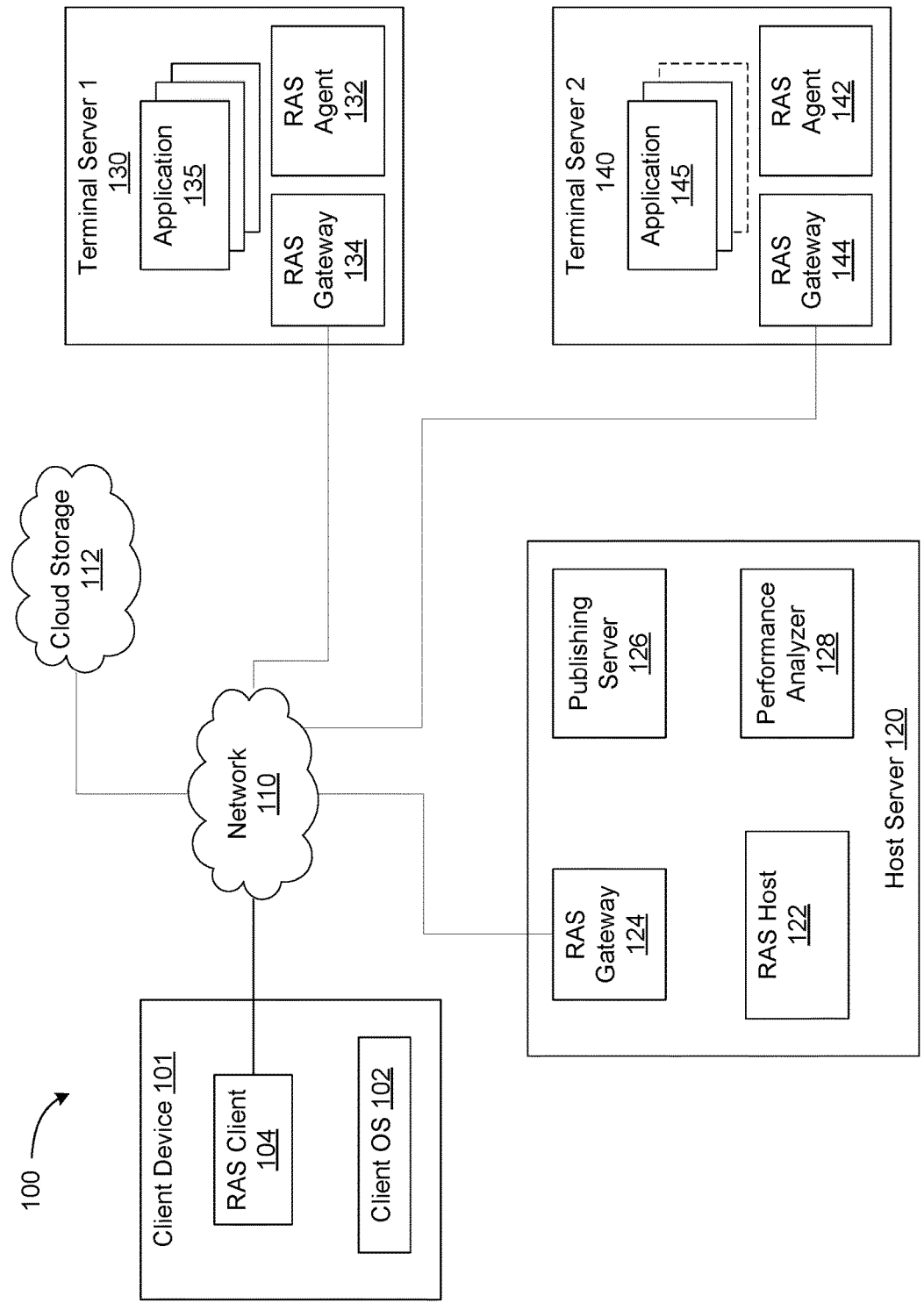
FIG. 1A illustrates schematically a high-level block diagram of an example remote-access environment providing seamless server switching, in accordance with some implementations.

The implementations disclosed herein provide for transferring execution of applications between different remote-access terminal servers. In a network environment it is often advantageous for a user of a client device to execute applications on a remote server rather than on the client device. In a remote-access environment, a host server offering remote access functionality may provide a network connection to the client device and receive a request from the user of the client device to execute an application. The host server may utilize terminal servers to execute requested applications. A terminal server refers to a component (e.g., a software component of a host server or a separate device connected to the host server via a network) that is able to execute a particular application (residing locally or remotely) in response to the host server's instruction identifying the application.

The remote host may instruct one of the terminal servers connected to the network to execute the application and facilitate an association of the client device with the first terminal server. The first terminal server may enable the user of the client device to use the resources of the first terminal server to execute the application as if the application were local to the client device. However, utilization of remote servers can present a number of issues and challenges. For example, the first terminal sever may be providing remote access to a significant number of client devices with each client device, possibly, executing multiple applications. In some instances, the first terminal server may become overloaded with applications run and operated by a large number of client devices, so that the quality of experiences of the users of some or all of the client devices may diminish. In other instances, the bandwidth of the network connection to the first terminal server may deteriorate and the throughput to the first terminal server may diminish. In yet other instances, an administrator of the first terminal server or the host server may need to temporarily disable the first terminal server for a reboot, maintenance, upgrades, troubleshooting, or other actions that may require making the first terminal server unavailable to the remote client devices. In such instances, the applications run by the remote client device(s) may need to be stopped on the first terminal server and restarted on a second terminal server that may be a part of the same remote-access computing environment. Simply terminating the current remote access session may result in a loss of data whereas waiting for the user to finish the execution of the application may be impractical, especially when multiple client devices join the remote-access environment at unpredictable times. On the other hand, requesting that the user of the client device close the application and initiate another remote-access request through the host server to a different terminal server may be inconvenient for the user. In some instances, the remote desktop functionality may be accessed by the user to execute concurrently an email program, an internet browser, a word-processor, a presentation software (e.g., PowerPoint), and/or other programs. There may be multiple documents opened in a single application (e.g., multiple Word .doc files). Closing and restarting all such files in multiple applications may be disruptive to the user's work.

Aspects of the instant disclosure address this and other problems by enabling a host server (which may or may not be different from the first terminal server) to identify the files opened in relation to various applications run by the user of a client device on the first terminal server and restart execution of the same files on the second terminal server seamlessly—i.e., without excessive involvement on the part of the user. In one implementation, this may be accomplished by determining the identifiers of the storage locations of the opened files. In one implementation, where the files opened in relation to the application(s) are stored on a network storage (e.g., a cloud), the identifiers of the storage locations may be addresses or paths of the opened files on the network storage. In one implementation, to obtain the identifiers of the opened files, the host server may first determine handles for application processes executed on the first remote server and use the determined handles to obtain the identifiers of the storage locations of the opened files. In another implementation, the host server may hook to the application processes, intercept programs calls between the application and the user, and use the intercepted program calls to obtain the identifiers of the storage locations for the opened files. The host server may terminate the execution of the application on the first terminal server and start execution of the application on the second terminal server using the identifiers of the storage locations of the opened files. This may enable seamless server switching, which minimizes delay time in user's accessibility to the application. Seamless server switching may also significantly reduce or eliminate the need for actions on the part of the user. In some implementations, once the host server determines that the execution of the application on the first terminal server is to be terminated and obtains the identifiers of the storage locations of the opened files, the host server may notify the user of the client device that there may be a delay in user's remote-access computing. In other implementations, the user may be unaware that the application is executed remotely. In such implementations, the user may receive a notice that a delay in the application execution is about to occur. Yet in other implementations, the user may not be notified at all about the upcoming interruption. The latter scenario may be feasible in implementations with a fast network connection and a quick application launching on the second terminal server.

FIG. 1A illustrates schematically a high-level block diagram of an example remote-access environment 100 providing seamless server switching, in accordance with some implementations. The remote-access environment 100 may be a remote desktop service (RDS). Computer systems, appliances, network segments, and other software or hardware components are shown in FIG. 1A for illustrative purposes only, and the scope of the present disclosure is not limited to the architecture shown in FIG. 1A. Routers, firewalls, load balancers, network switches, and/or various other software or hardware components may be omitted from FIG. 1A for conciseness. Various other computer systems, software or hardware components, and/or methods of their interconnection—which are not shown in FIG. 1A—may be compatible with the methods and systems described herein. The systems and methods described herein may be implemented by hardware (e.g., general purpose and/or specialized processing devices, and/or other devices and associated circuitry), software (e.g., instructions executable by a processing device), or a combination thereof. Various aspects of the above referenced disclosure are described in details below by way of examples, rather than by way of limitation.

As schematically illustrated by FIG. 1A, the client-host computing system 100 may comprise one or more client devices 101, which may communicate over a network 110 with one or more host servers 120. The network 110 can be Internet, LAN, or a telecommunications network. The network can have access to a cloud storage 112. A cloud storage may be located off-premises, and use third-party cloud storage services, or similar platforms. Alternatively, cloud storage 112 can be located on-premises. Cloud storage can be a part of the host server 120 or one of the client devices 101. In the description below, the singular terms, such as "client device," "host," "server," "environment," etc. will be understood to also correspond to plural terms, whenever more than one device or component can possibly be used. The host server 120 may include one or more central processing units (CPU)—not explicitly shown on FIG. 1A—also referred to as "processing devices," communicatively coupled to one or more memory devices, and one or more peripheral devices via buses (not shown). "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Processing device" herein refers to a device capable of executing instructions encoding arithmetic, logical, or I/O operations. In one illustrative example, a processing device may follow Von Neumann architectural model and may include an arithmetic logic unit (ALU), a control unit, and a plurality of registers. "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices, such as flash memory cards, compact disks, HDDs, or SSDs.

The host server 120 may implement a virtual execution environment, for example but not limited to, one of the virtualized execution environments, such as RDS, virtual desktop infrastructures, containerization engines, or virtual execution environments provided by HTML5-enabled browsers. The remote-access environment may provide client authentication, load balancing, and/or other features related to brokering the client connections to the virtual execution environments. In one illustrative example, the remote-access environment may be enabled by the Parallels® RAS. The host server 120 may include a remote application server component (RAS host) 122. The RAS host 122 may be connected to the network 110 via a secure RAS gateway 124. The RAS host 122 may be communicating with an optional client authenticator service (not shown) which helps to establish the identity of a user of the client device 101 and negotiate a client-host connection via the network 110. Upon establishing and negotiating a connection with the client device 101, the client authenticator service may determine the level of access the particular user/client device combination may have to the RAS host 122. By way of example, a user with the highest access level connecting from a work (e.g., desktop) computer may be allowed the maximum access to the RAS host 122 whereas the same user accessing the host server 120 from a mobile device may be allowed a more limited access to the RAS host 122.

Once the client authenticator determines the access level, the RAS host 122 may provide the list of resources available to the client device 101 via a publishing server 126 and transmit this list to the client device 101 via the network 110. A RAS client 104 may be located on the client device 101 and supported by the operating system 102. The RAS client 104 may receive the list of published applications from the remote host and offer it to the user of the client device 101. The list may have graphical representations, such as windows, pop-ups, icons, etc. A console of the RAS host 122 may be used to display a list of published applications on RAS client 104. The RAS client 104 may allow the user of the client device 101 to launch one or more applications on the remote host as if the application were executed on the client device 101. The RAS client 104 may transmit the list of client-selected applications to be executed on a remote-access environment to the RAS host 122 of the host server 120 over the network 110 and through the RAS gateway 124. The term "client-selected" should be understood in the broadest sense as including those applications that a human operator chooses to launch as well as applications that are executed automatically by the client device 101, such as applications auto-run during boot, or in response to actions taken by the user (such as starting a mail client or another application), or triggered by extrinsic evens (such as starting a teleconferencing application at a pre-arranged instance of time).

In some embodiments, RAS client 104 may be an HTML5-enabled browser. In such embodiments, the remote-access environment 100 may be configured to display published remote applications in one or more HTML pages which may be accessed by HTML5-enabled browsers running on the client devices. Thus, from the users' perspective, the published remote applications may be perceived as web-based applications. A menu associated with each entry of the list may include a plurality of actions accessible to the user with respect to the published application, such as the client gateway identifier, the published application identifier, and the height and width of the frame to be displayed by the client device for rendering the application output. A JavaScript code may be utilized for receiving and displaying the data by the client browser.

Responsive to the user's selection from the list of applications provided to the RAS client 104 by the RAS host 122, the host server 120 may launch the application (henceforth, the singular word "application" should be understood to mean the entire plurality of applications selected by the user, if applicable) on the first terminal server 130 using one or more of the host's processing units and/or memory devices. The RAS host 122 may contain within itself, or be coupled to, a performance analyzer 128. The performance analyzer may be a software component coupled to the network 110 and to the host server 120 directly. The performance analyzer 128 may collect data regarding the bandwidth, noise, and the quality of the network 110, the number and nature of applications already running on the first terminal server 130 and/or the second terminal server 140. (Additional terminal servers in the remote-access environment 100 may be implied, as applicable, even if not shown explicitly on FIG. 1A). In one implementation, the performance analyzer 128 may provide the data to a system administrator of the host server 120 and/or of the terminal servers 130, 140. The performance analyzer 128 may provide recommendations to the system administrator regarding which terminal server of the remote-access environment 100 is to execute the application selected by the user of the client device 101. In some implementations, the performance analyzer 128 may automatically determine, alone or in conjunction with the RAS host 122, which terminal server is to execute the application, without participation from the system administrator.

In some implementations, once the host server 120 has selected a terminal server for execution of the application requested by the client device 101, the RAS host 122 may facilitate a remote-access session between the client device 101 and the selected terminal device. For example, if the first terminal server 130 is selected, the client device 101 may access, via the network 110, the first terminal server 130 through its RAS gateway 134. A RAS agent 132 may receive instructions from the RAS host 122 to execute one or more applications 135 selected by the user of the client device 101. In some instances, one or more applications may be executed, in a similar fashion, on the second terminal server 140 if the host server 120 determines that the second terminal server 140 provides a better functionality for the type of applications requested by the user. The second terminal server 140 may have its own RAS agent 142 and RAS gateway to provide a safe access to the client device 101. In some implementations, the host server 120 may determine that some of the applications 135 requested by the user are to be executed on the first terminal server 130 whereas some of the remaining applications 145 are to be executed on the second terminal server 140. For example, most of the applications may be executed on the first terminal server 130, which may have a higher internet bandwidth, but some applications (e.g., requiring a specialized graphics editing software) may have to be executed on the second terminal server 140 even at a disadvantage of a lower bandwidth.

In some implementations, the host server 120 may balance the number of applications 135 and 145 executed on different servers 130 and 140 and determine where to direct different clients and their applications with the global objective of optimizing the overall performance of the remote-access environment 100. In other implementations, the user of the client device 101 may be given an option to make a choice of the terminal server. For example, the publishing server 126 may provide the user with both the list of applications supported by the remote-access environment 100 and the list of terminal servers accessible to the user.

In some implementations, the files opened in relation to the applications 135 (and/or applications 145) may be stored on the cloud storage 112 and be accessible to both the first terminal server 130 and the second terminal server 140 via the network 110. In some implementations, the application files may be stored on a shared network drive. In some implementations, the files are stored on a user profile disk (UPD) dedicated to the user's profile.

Figure 1B:
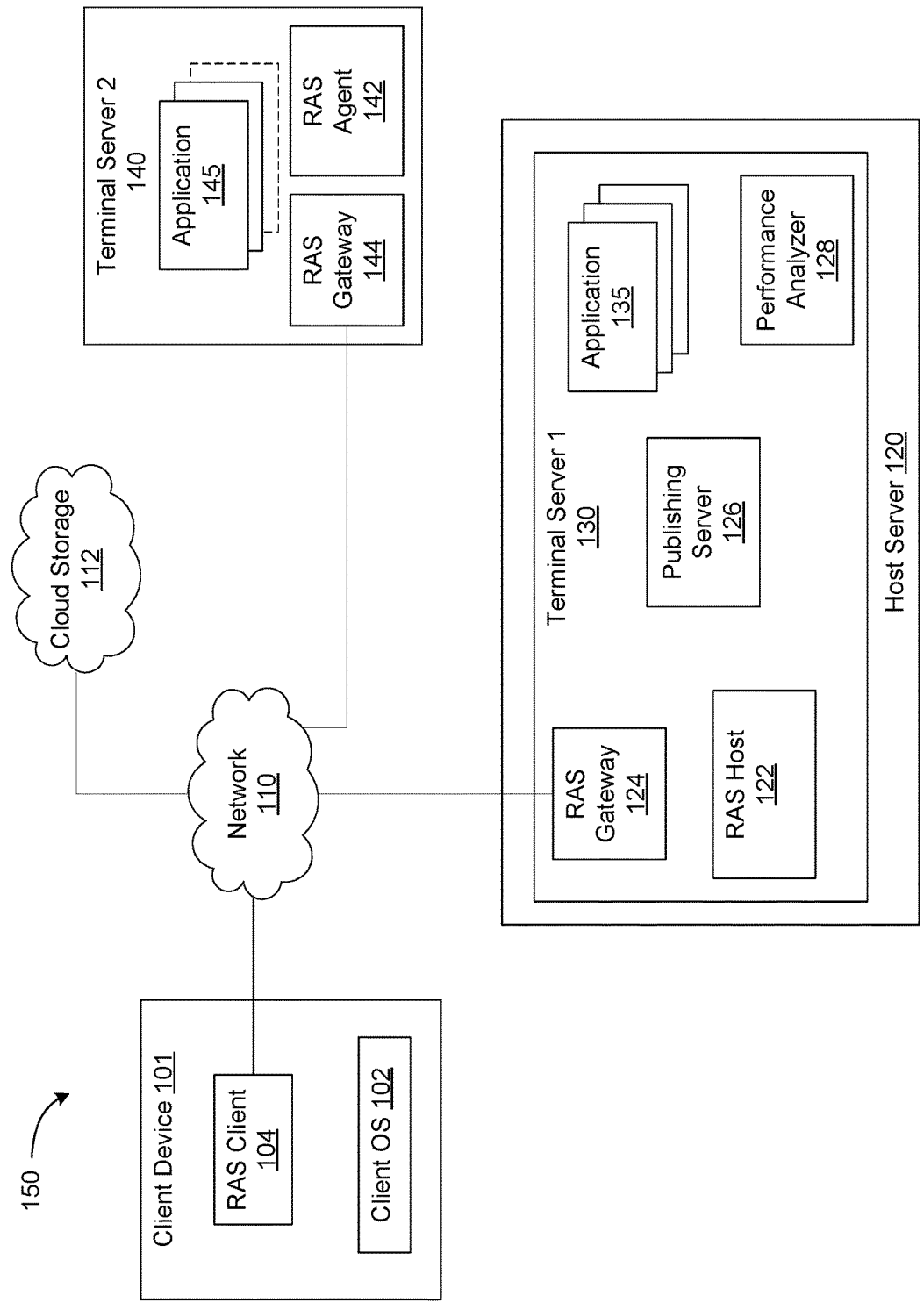
FIG. 1B illustrates schematically a high-level block diagram of an example remote-access environment for seamless server switching, in which one of the terminal servers resides on a host server, in accordance with some implementations.

FIG. 1B illustrates schematically a high-level block diagram of an example remote-access environment 150 for seamless server switching, in which one of the terminal servers resides on the host server 120, in accordance with some implementations. In such implementation, the first terminal server 130 may share the operating system (or hypervisor—in case of a virtual machine-type remote access) as well as RAS host 124 and the RAS gateway 124 with the host server 120. The shared operating system (or hypervisor) may support the publishing server 126 and, optionally, the performance analyzer 128. Similarly to the above-disclosed implementations of FIG. 1A, the RAS host 122, in some implementations, may determine to execute some applications 135 on the host server 120 while executing other applications 145 on the second terminal server 140 via the network 110. The files associated with the applications 135 executed on the host server 120 and the applications 145 executed on the second terminal server may be located on the cloud storage 112 accessible by the host server 120, the second terminal server 140, and additional terminal servers (not shown), as applicable.

With further reference to FIGS. 1A and 1B, seamless server switching in remote-access environments may be implemented as described in more detail below. A plurality of servers, such as the host server 120, the first terminal server 130, the second terminal server 140, and the like, may be providing a remote-access environment 100, e.g., a remote desktop environment, to a client device 101. The client device 101 may connect to the RAS host 122 via the network 110 through the secure RAS gateway 124. The publishing server 126 may provide a user of the client device 101 a list of available applications, and the user may make a request from the client device 101 to execute an application from the list of available applications. In some implementations, the client device 101 may be configured to make a request to execute the application without an input from the user.

The host server 120 may select, from a plurality of terminal servers, the first terminal server 130 to execute the application. In some implementations, the host server 120 may use the first terminal server 130 as a default server for the type of application selected by the user and/or the client device 101. In other implementations, the system administrator of the host server 120 may participate in the selection of the first terminal server 130. Yet, in some implementations, the performance analyzer 128 may participate in the selection of the first terminal server 130. For example, the performance analyzer 128 may calculate a first efficiency value that indicates an estimated efficiency of running the client-selected application on the first terminal server 130 and a second efficiency value that indicates an estimated efficiency of running the application on the second terminal server 140. RAS host 122 of the host server 120 may compare the two estimated efficiencies, determine that the first efficiency is higher than the second efficiency, and select the first terminal server 130 to execute the application. The efficiency values may be calculated using a variety of performance markers such as the speeds of the application execution on the first terminal server 130 and the second terminal server 140, the speed of data transfer between the client device 101, the terminal servers, and the cloud storage 112, and the like. The remote efficiency value may then be calculated by giving specific numerical weights to various performance markers, weights depending on a specific character of the client-selected application. For example, in calculating the remote efficiency value for a computing-heavy applications, a greater weight may be given to application execution speed and a lesser weight to the network bandwidth. In contrast, for a complex real-time graphical application requiring moderate computing power, a greater weight may be assigned to the network connection.

Upon selecting the first terminal server 130 to execute the client-selected application, the RAS host 122 may facilitate the association of the client device 101 with the first terminal server 130 through its RAS gateway 134. The first terminal server 130 may instantiate the application 135 and provide access to this application to the client device 101 via the network 110. In one implementation, the executable files may be stored locally on the first terminal server 130. In some implementation, the first terminal server 130 may have to request the executable files from the cloud storage 112 or the host server 102, or from another storage location. The user of the client device 101 may open one or more application files associated with the application 135. The application files may be opened from the cloud storage 112, in one implementation. In another implementation, the application files may be initially stored on the client device 101 but may be copied to the cloud storage 112 once the application 130 has been started on the first terminal server 130. There may be multiple files associated with the application 135. For example, the user may use a word-processing application to open several files to edit. In other implementations, the user may open more than one application at the same time, with multiple files and windows opened in each application.

As the user of the client device is accessing the application 135 on the first terminal server 130, the conditions of the remote-access environment 100 may change. For example, it may be determined that the first terminal server 130 may need to be rebooted, updated, or shut down for maintenance. In some implementations, the network connection to the first terminal server 130 may have slowed down. In other implementations, the first terminal server 130 may be overloaded with too many applications and the administrator of the host server 120 may decide to re-balance the terminal servers' workloads. In other implementations, the performance analyzer 128 may determine, without an input from the administrator, that optimization of the resources of the remote-access environment 100 favors transferring the application to the second terminal server 140.

To provide seamless server switching from the first terminal server 130 to the second terminal server 140 and to minimize disruptions in the user's access to the application, the host server 120 may perform a series of operations directed at identifying application files that are opened by a user of the client device in relation to the application and the storage locations of the application files. In one implementation, the user of the client device may be notified that she will be temporarily unable to work with the currently opened files. The user may be advised that the delay may take a specific amount of time, such as a few seconds, in some implementations. In one implementation, the user of the client device 101 may be blocked from accessing the currently opened files, and the user may not see the remote session anymore. In the meantime, the application files may remain open and application processes may still be running on the first terminal server 130.

As one sample approach, the host server 120, in some implementations, acting through the RAS host 122, may attach to the running processes associated with the application in the disconnected session. To determine the identifiers of the storage locations where the application files opened by the user may be stored (such as the cloud storage paths), the RAS host 122 may determine handles for the application processes. The handles may include references to the opened files. In some implementations, for every application file opened on the first terminal server 130, there may be a handle associated with it. In one implementation, pertaining to MS Windows® operating system, the RAS host 122 acting in conjunction with the RAS agent 132 of the first terminal server 130, may use the NtQuerySystemInformation API (application programming interface) to retrieve the handles associated with the execution of the application on the first terminal server 130. The NtQuerySystemInformation API may be used in conjunction with the SystemHandleInformation function. The NtQuerySystemInformation API may provide a list of handles opened by various processes. For example, the NtQuerySystemInformation API may return an array of the structure SYSTEM_HANDLE containing file handles, Mutex handles, event handles, and the like. In some implementations, the NtQuerySystemInformation with SystemHandleInformation may return a buffer length mismatch if a supplied buffer size is too small; to overcome this, one may call NtQuerySystemInformation in a loop until success, by reallocating and doubling the buffer size each time it returns a mismatch.

After a list of handles has been obtained, the RAS agent 132 may determine the types and names of the handles by duplicating the handles using the DuplicateHandle API. To determine the names of the processes, in some implementations, the RAS agent 132 may use PROCESS_QUERY_INFORMATION access and call GetProcessId. Alternatively, the RAS agent 132 may use the NtQueryInformationProcess API with ProcessBasicInformation function. The names of other objects may be obtained by duplicating the handle and using the NtQueryObject API with the ObjectNameInformation function and/or the ObjectTypeInformation function. As a result, filenames in the native filename format may be obtained.

In this manner, the RAS host 122 and/or RAS agent 132 may determine the identifiers (e.g., paths) of storage locations of one or more application files that are opened by the user of the client device in relation to the application. In some implementations, some of the determined identifiers may be ignored. For example, if the user is executing a Microsoft Word application, the above-described approach may return various files, e.g., C:\Windows\nt.dll, E:\Users\user1\a.config and \\some-server\some-file.doc. In such instances, the library and the configuration files may be ignored and only the file whose extension is associated with the application (namely, the .doc file in this example) may be saved as a relevant identifier.

As another sample approach, in some implementations, the RAS host 122 and/or RAS agent 132 may determine the identifiers of the storage locations of the application files by intercepting program calls associated with the application. For example, after the decision to transfer execution of the application from the first terminal server 130 to the second terminal server 140 is made, the RAS host 122 and/or RAS agent 132 may hook to the application events while the application is still running. In such implementations, the user of the client device 101 may continue to access the application session for some time. While the application is still being accessed by the client device 101, the RAS host 122 and/or RAS agent 132 may begin intercepting program calls exchanged by the user and the application. In some implementations, a program call may be a notification code, for example a "save file" code or an "open file" code. For example, in MS Windows® implementations, a notification may be a CDN_FILEOK code issued when a user attempts to open a file and the application responds with creating an "open file" window, or a user attempts to save a file and the application responds with creating a "save file as" window. The intercepted identifiers (e.g., cloud storage paths) of the application files may then be stored in a memory available to the RAS host 122 and/or RAS agent 132 for the use in restarting the application on the second terminal server 140. In some implementations, the RAS host 122 and/or RAS agent 132 may begin intercepting the user-application dialog even before the moment when the decision to transfer the application is made, e.g., from the moment when the application is first executed on the first terminal server 122. Such implementation may have an advantage of completeness: if all "open" and "save" program calls are intercepted during the history of the application execution, there will be an added certainly that no application files have been overlooked by the interception procedure.

After the identifiers of the storage locations of the application files opened by the user of the client device have been determined, the user of the client device 101 may be blocked from accessing the currently opened files and the user may not see the remote session anymore, similarly to the procedure in the first approach disclosed above. Subsequently, the execution of the application on the first terminal server 130 may be terminated. For example, a graceful close request may be sent to the first terminal server 130 by the host sever 120 to close the application process. For example, in MS Windows® implementations, a WM_CLOSE request may be used. The WM_CLOSE request may emulate the user's action to close the application when the user clicks on its [X] button. The application may ask—similarly to the standard user-application dialog—if it needs to save one or more files. For example, the application may respond to the WM_CLOSE request with a pop-up save request window "do you want to save changes?" Because the user of the client device 101 may already be disconnected from the application session and cannot respond to the save call from the application, the RAS host 122 and/or RAS agent 132 may programmatically respond to the window associated with the save request ("pressing" the "Yes" button) and accept the save request to save one or more files associated with the application. More specifically, this can be accomplished by hooking to the application windows, for example by using the SetWindowsHookEx function and determining the particular window corresponding to the pop-up window corresponding to the save request. In the hook code this action may be programmed as follows, in one implementation.

HWND hWnd=FindWindow(NULL,"<Saving dialog header text>");
if(hWnd) {HWND hBtn=FindWindowEx(hWnd, NULL, NULL, "<Yes button text>");
if(hBtn) PostMessage(hBtn, BM_CLICK, NULL, 0);}

In some implementations, after closing the application and responding to the save requests, the RAS host 122 may wait to ensure that the application files are properly closed and, therefore, free to be used by another terminal server. In MS Windows® implementations, to verify that the application files are free, the RAS host 122 may use the OpenProcess function and the WaitForSingleObject API.

After execution of the application on the first terminal server 130 has been terminated, the RAS host 122 may take steps to enable continuing execution of the application on the second terminal server 140. In some implementations, the performance analyzer 128 may provide recommendations to the administrator regarding which terminal server of the remote-access environment 100 is to resume the execution of the application, and the administrator makes this decision. In some implementations, the performance analyzer 128 may make this decision automatically, without the administrator input.

In some implementations, after the decision to resume the application on the second terminal server 140 has been made, the RAS host 122 may send an invite to the user of the client device 101, inviting the user to resume the application on the second terminal server 140. At the beginning of the transition, when the original application session is disconnected from the client device 101, the RAS client 104 may display a message to the user that an application is temporary suspended, or that a reconnect is happening (or another similar notification). After the second terminal server 140 has been identified, the RAS client 104 may display to the user a message asking for the user's consent to transfer the application there. In some implementations, no permission may be solicited from the user. In some implementations, the user may not be even informed that the application is about to be continued on a different server.

In those implementations where the user is invited to approve server switching, the user may accept the invite by, e.g., clicking on the "Yes" button in the notification window. Upon receiving the acceptance response from the user to execute the application on the second terminal server, the RAS host 122 may send, through the RAS gateway 124 and over the network 110, an execution request to the second terminal server 140 to start the application and provide the application to the client device 110. The execution request to the second terminal server 140 may include, as parameters, the identifiers of the storage locations of the application file(s) that the user opened during the execution of the application on the first terminal server 130. For example, the identifiers may include the addresses to the application files on the cloud storage 112 accessible to the second terminal server 140 over the network 110. Accordingly, when the application is restarted, the application files may be automatically accessed on the cloud storage 112 and the application session may be restored in the state of its execution that is the same as was when the application session on the first terminal server 130 was disconnected from the client device 101. For example, all application files originally opened by the user on the first terminal server 130 may now be reopened on the second terminal server 140, with all up-to-date edits and changes saved. The user may work with the re-opened application files in the same way as prior to the server switching. The outcome of the seamless server switching may be a restoration of the state of the application with a minimal interruption of the user's activities, short duration of the transition period, and few actions required on the part of the user.

Figure 2:
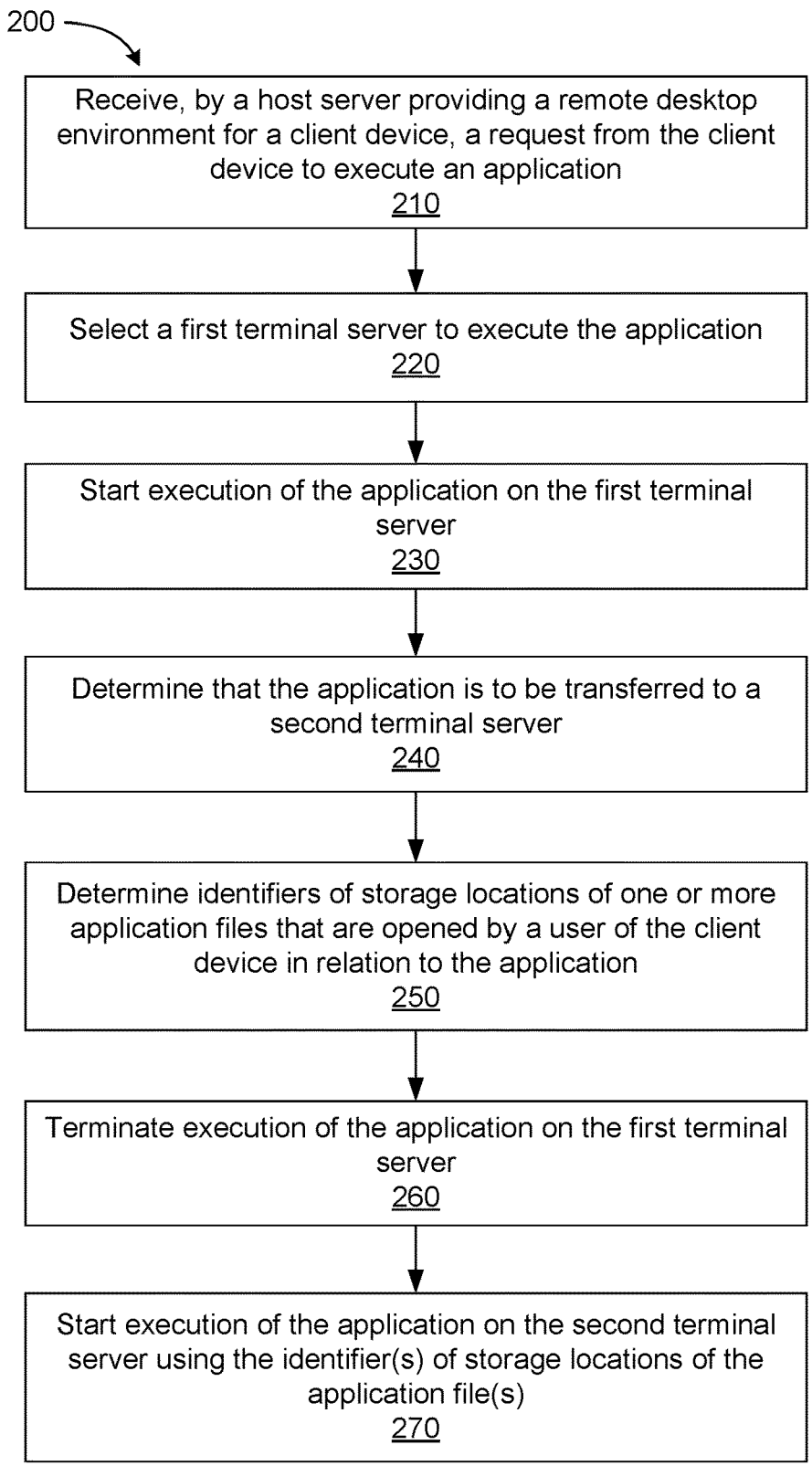
FIG. 2 depicts a flow diagram of one illustrative example of a method of seamless server switching during a remote-access application execution, in accordance with some implementations.

FIG. 2 depicts a flow diagram of one illustrative example of a method 200 of seamless server switching during a remote-access application execution, in accordance with some implementations. Method 200 and/or each of its individual functions, routines, subroutines, or operations may be performed by one or more processing units of the remote host implementing the method, e.g., the host server 120, the first terminal server 130, the second terminal server 140, and the like. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Various steps of the method 200 may be performed in a different order compared to the order shown in FIG. 2. Some steps may be performed concurrently with other steps.

The method 200 may begin with receiving, by a host server providing a remote-access (e.g., a remote desktop) environment to a client device, a request from the client device to execute an application (210). Prior to receiving the request, the host server 120 may establish a connection with the client device 101. This client-host connection may be provided via a local area network or a public network such as the Internet, or with the help of a telecommunications network. Alternatively, the client-host connection may be initiated by a user of the client device. In yet other embodiments, the connection may be permanently established. The host server 120 may support a remote-access environment with a plurality of terminal servers.

The method 200 may continue with selecting, from a plurality of terminal servers, a first terminal server to execute the application (220). As described above in relation to FIGS. 1A and 1B, the selection of the first terminal server may be performed subject to receiving an indication from an administrator, or may be done automatically by the RAS host 122 (in conjunction with the performance analyzer 126), or as some combination of these two possibilities.

The method 200 may continue with starting execution of the application on the first terminal server (230). By way of example, the host server 120 may facilitate a connection of the client device 101 with the first terminal server 130 over the network 110, using RAS client 104 and RAS agent 132. In some implementations, the application 135 may be executed on the first terminal server 130 and provided to the client device 101 so that a user of the client device may experience the application as if it is executed locally on the client device 101.

The method 200 may continue with determining that the application 135 is to be transferred to a second terminal server 140 of the plurality of terminal servers (240). In some implementations, the administrator may decide to take the first terminal 130 server of the grid, or the quality of the network connectivity to the first terminal server 130 has decreased since the start of the application execution.

The method 200 may continue with determining identifiers of storage locations of one or more application files that are opened by the user of the client device 101 in relation to the application 130. In some implementations, the RAS host 120 may determine handles of the processes corresponding to the application 130 and determine paths of one or more opened files associated with the application 130. In other implementations, the RAS host 120 may hook into the dialog between the application 130 and the user of the application 130 and determine the identifiers of the storage locations by intercepting "open" and/or "save" calls issued by the application 130. The storage locations may be on the cloud storage 112.

Having determined the identifiers of the storage locations of one or more application files opened by the user, the method 200 may proceed with terminating execution of the application on the first terminal server (260) and starting execution of the application on the second terminal server using the identifiers of the storage locations of the one or more application files (270). The storage locations on the cloud storage 112 may be accessible to the second terminal server 140.

Figure 3A:
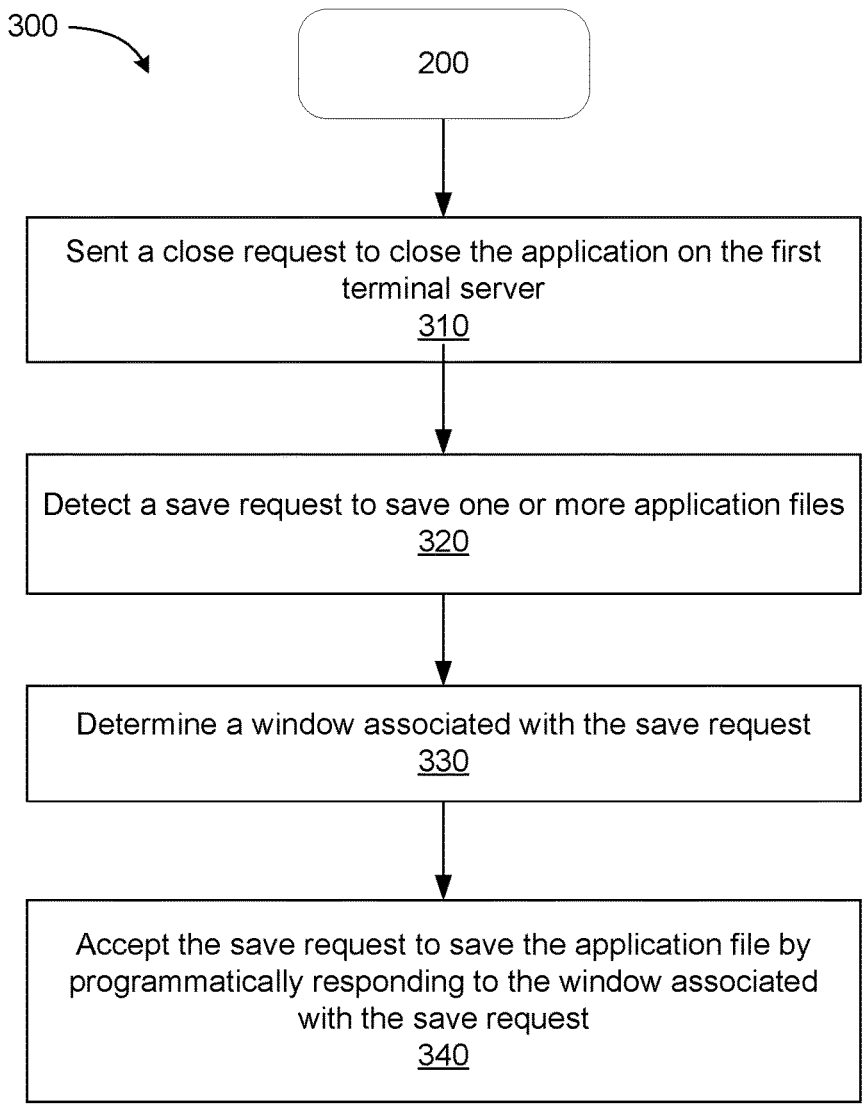
FIG. 3A depicts a flow diagram of one illustrative example of a method of terminating execution of the application on a first terminal server, in accordance with some implementations.
Figure 3B:
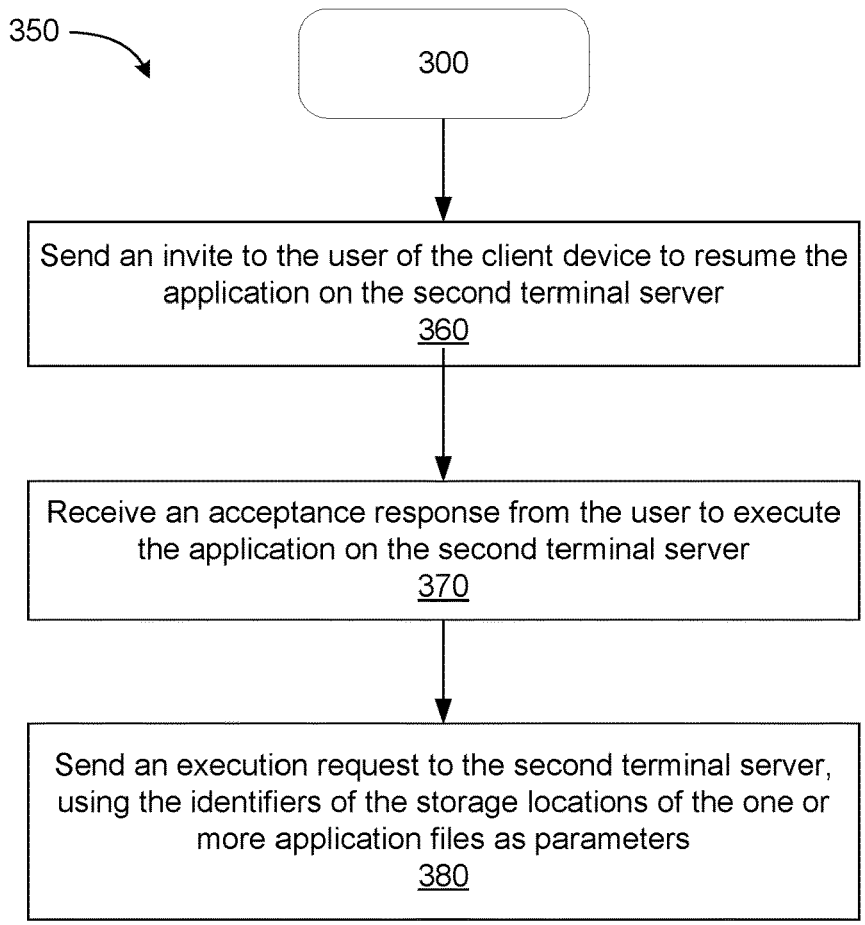
FIG. 3B depicts a flow diagram of one illustrative example of method of starting execution of the application on a second terminal server, in accordance with some implementations.

FIG. 3A depicts a flow diagram of one illustrative example of a method 300 of terminating execution of the application on the first terminal server 130, in accordance with some implementations. FIG. 3B depicts a flow diagram of one illustrative example of method 350 of starting execution of the application on the second terminal server 140, in accordance with some implementations. Methods 300 and 350 as well as their individual functions, routines, subroutines, or operations may be performed by one or more processing units of the remote host implementing the method, e.g., the host server 120, the first terminal server 130, the second terminal server 140, and the like. In certain implementations, methods 300 and 350 may be performed by a single processing thread. Alternatively, methods 300 and 350 may be performed by two or more processing threads, each thread executing one or more individual functions, routines, subroutines, or operations of the method. Alternatively, the processing threads implementing method 300 may be executed asynchronously with respect to each other. Various steps of the methods 300 and 350 may be performed in a different order compared with the order shown in FIGS. 3A and 3B. Some steps of methods 300 and 350 may be performed concurrently with other steps of the same methods. In some implementations, some steps of method 300 may be performed concurrently with some steps of method 350.

The method 300 may begin with at least some steps of the method 200 described above. The method 300 may continue with sending a close request to close the application on the first terminal server (310). The close request may be a graceful close request (as opposed to a request to kill a process) similar to a close request generated by a user issuing a File>Close instruction to the application. The close request may be issued by the RAS host 122 and/or RAS agent 132.

The method 300 may continue with receiving a save request to save a file from one or more application files opened by the user (320). The save request may be a window containing the question "do you want to save changes?" The save request may be intercepted by the RAS host 122. The method 300 may continue with determining a window associated with the save request (330). The RAS host 122 may look into the handles of the opened processes associated with the application, identify the window associated with the save request, and programmatically accept the save request to save the application file. In some implementations, there may be multiple files opened by the user and, correspondingly, multiple save requests to save more than one application files.

The method 350 of starting the application on the second terminal server 140 may begin with at least some steps of the method 300 (which may include at least some of the steps of the method 200). For example, the method 350 may begin with sending an invite to the user of the client device 101 to resume the application 135 on the second terminal server 140 (360). The method 350 may continue with receiving an acceptance response from the user to execute the application on the second terminal server (370). In some implementations, sending the invite and receiving the acceptance may be performed by the RAS host 122 in communication with the RAS client 104. In some implementations one or both of sending the invite and receiving the acceptance may be optional.

The method 350 may continue with sending an execution request to the second terminal server, using the identifiers of storage locations of the application files as parameters. (380). The result of some or all of the steps of methods 200, 300, and 350 may be a replication of the state of the application on the second terminal server 140 with a minimal disruption to the user's work.

Figure 4:
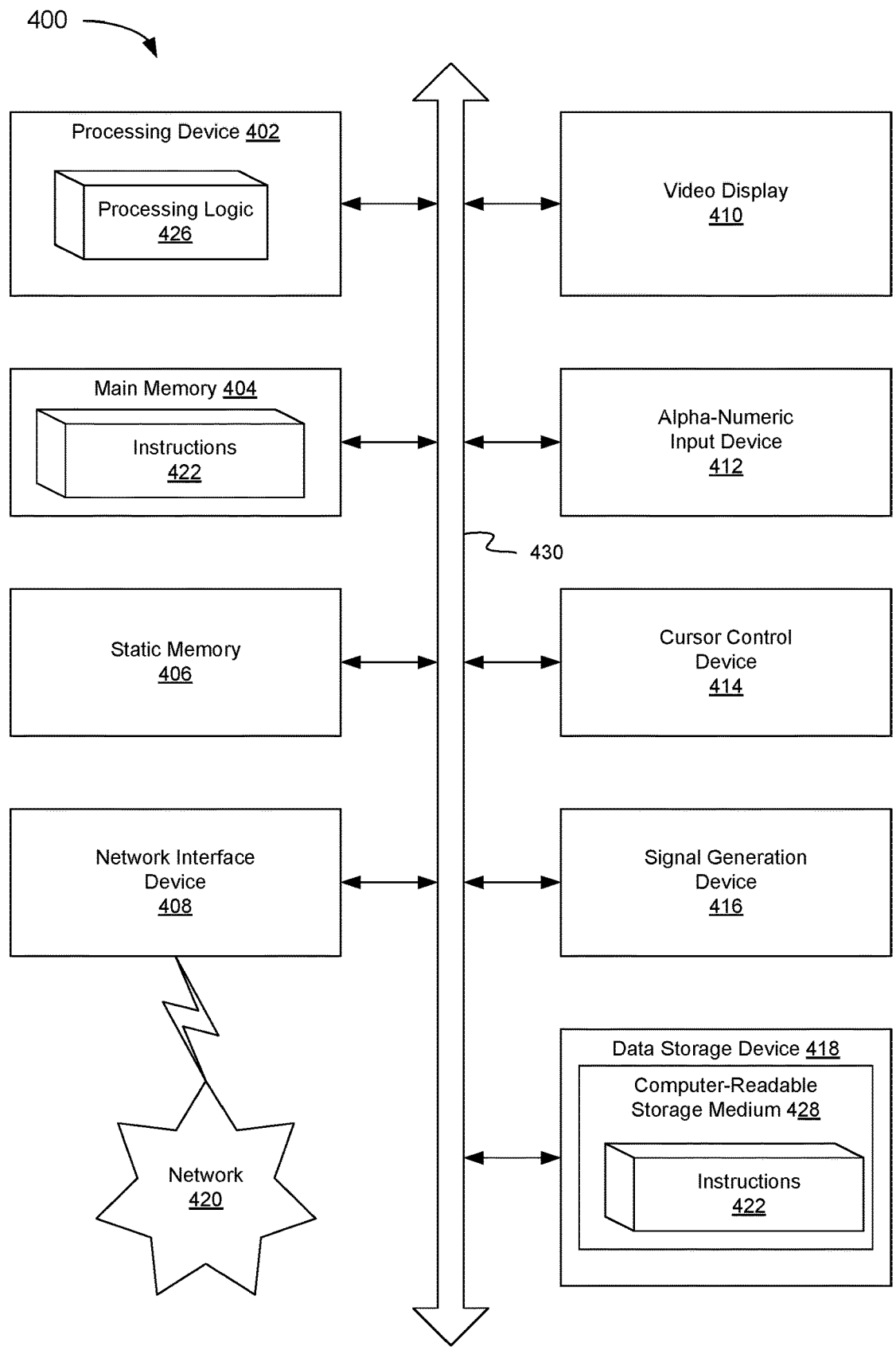
FIG. 4 depicts a block diagram of an example computer system operating in accordance with one or more aspects of the present disclosure.

FIG. 4 depicts a block diagram of an example computer system 400 operating in accordance with one or more aspects of the present disclosure. In various illustrative examples, computer system 400 may represent the host server 120, the first terminal server 130, the second terminal server 140, and/or client device 101, illustrated in FIGS. 1A and 1B.

Example computer system 400 may be connected to other computer systems in a LAN, an intranet, an extranet, and/or the Internet. Computer system 400 may operate in the capacity of a server in a client-server network environment. Computer system 400 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 400 may include a processing device 402 (also referred to as a processor or CPU), a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory (e.g., a data storage device 418), which may communicate with each other via a bus 730.

Processing device 402 represents one or more general-purpose processing devices such as a microprocessor, central processing unit, or the like. More particularly, processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 402 may be configured to execute instructions implementing method 200 of seamless server switching during remote-access application execution, and/or method 300 of terminating execution of the application on the first terminal server, and/or method 350 of starting execution of the application on the second terminal server to the client device.

Example computer system 400 may further comprise a network interface device 408, which may be communicatively coupled to a network 420. Example computer system 400 may further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 416 (e.g., a speaker).

Data storage device 418 may include a computer-readable storage medium (or, more specifically, a non-transitory computer-readable storage medium) 428 on which is stored one or more sets of executable instructions 422. In accordance with one or more aspects of the present disclosure, executable instructions 422 may comprise executable instructions implementing method 200 of seamless server switching during remote-access application execution, and/or method 300 of terminating execution of the application on the first terminal server, and/or method 350 of starting execution of the application on the second terminal server to the client device.

Executable instructions 422 may also reside, completely or at least partially, within main memory 404 and/or within processing device 402 during execution thereof by example computer system 400, main memory 404 and processing device 402 also constituting computer-readable storage media. Executable instructions 422 may further be transmitted or received over a network via network interface device 408.

While the computer-readable storage medium 428 is shown in FIG. 4 as a single medium, the term "computer-readable storage medium" should be taken to include a single medium or multiple media (e.g., a centralized or distributed database, and/or associated caches and servers) that store the one or more sets of VM operating instructions.

The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   receiving, by a host server providing a remote desktop environment to a client device, a first request from the client device to execute an application;
   selecting, from a plurality of terminal servers, a first terminal server to execute the application;
   initiating execution of the application on the first terminal server;
   determining that the application is to be transferred to a second terminal server of the plurality of terminal servers;
   determining identifiers of storage locations of one or more application files that are opened by a user of the client device in relation to the application;
   causing execution of the application on the first terminal server to be terminated; and
   initiating execution of the application on the second terminal server using the identifiers of the storage locations of the one or more application files; wherein
   causing execution of the application on the first terminal server to be terminated comprises:
      sending a close request to close the application on the first terminal server;
      detecting a save request to save a file from the one or more application files;
      determining a window associated with the save request; and
      accepting the save request to save the file from the one or more application files by programmatically responding to the window associated with the save request; and
   initiating execution of the application on the second terminal server comprises:
      sending an invite to the user of the client device, wherein the invite is to resume the application on the second terminal server;
      receiving an acceptance response from the user to execute the application on the second terminal server; and
      sending a second execution request to the second terminal server, wherein the second execution request comprises, as parameters, the identifiers of the storage locations of the one or more application files.

2. The method according to claim 1, wherein
the application is one of a plurality of applications; and
the host server determines that:

the application is one of a first subset of the plurality of applications which are to be executed on the second terminal server; and that a second subset of the applications are to be executed on the first terminal server.

3. The method according to claim 1, further comprising a performance analyzer coupled to the host server and a network to which the first terminal server and the second terminal server are connected; wherein the application is one of a plurality of applications;

the performance analyzer collects data relating to the network, the number and nature of applications already running on the first terminal server and the number and nature of applications already running on the second terminal server; and the performance analyzer determines a first subset of the plurality of applications which are to be executed on the first terminal server and a second subset of the plurality of applications which are to be executed on the second terminal server.

4. The method according to claim 1, wherein termination of the application on the first terminal server is triggered by the host server;

the termination process includes a save call from the application with respect to saving one or more of the application files opened by the client;

the first terminal server automatically programmatically responds to the save call such that the one or more of the application files opened by the client are automatically saved.

5. The method according to claim 1, further comprising a performance analyzer coupled to the host server and a network to which the first terminal server and the second terminal server are connected; wherein the application is one of a plurality of applications;

the performance analyzer collects data relating to the network, the number and nature of applications already running on the first terminal server and the number and nature of applications already running on the second terminal server; and the performance analyzer determines at least one of the first terminal server and the second terminal server.

6. A system comprising:

a memory that stores instructions; and a processing device to execute the instructions from the memory to:

receive, by a host server providing a remote desktop environment to a client device, a first request from the client device to execute an application;

select, from a plurality of terminal servers, a first terminal server to execute the application;

initiate execution of the application on the first terminal server;

determine that the application is to be transferred to a second terminal server of the plurality of terminal servers;

determine identifiers of storage locations of one or more application files that are opened by a user of the client device in relation to the application;

cause execution of the application on the first terminal server to be terminated; and initiate execution of the application on the second terminal server using the identifiers of the storage locations of the one or more application files;

wherein to cause execution of the application on the first terminal server to be terminated the processing device is further to:

send a close request to close the application on the first terminal server;

detect a save request to save a file from the one or more application files;

determine a window associated with the save request; and accept the save request to save the file from the one or more application files by programmatically responding to the window associated with the save request; and initiate execution of the application on the second terminal server the processing device is further to:

send an invite to the user of the client device, wherein the invite is to resume the application on the second terminal server;

receive an acceptance response from the user to execute the application on the second terminal server; and send a second execution request to the second terminal server, wherein the second execution request comprises, as parameters, the identifiers of the storage locations of the one or more application files.

7. The system according to claim 6, wherein the application is one of a plurality of applications; and the host server determines that:

the application is one of a first subset of the plurality of applications which are to be executed on the second terminal server; and that a second subset of the applications are to be executed on the first terminal server.

8. The system according to claim 6, further comprising a performance analyzer coupled to the host server and a network to which the first terminal server and the second terminal server are connected; wherein the application is one of a plurality of applications;

the performance analyzer collects data relating to the network, the number and nature of applications already running on the first terminal server and the number and nature of applications already running on the second terminal server; and the performance analyzer determines a first subset of the plurality of applications which are to be executed on the first terminal server and a second subset of the plurality of applications which are to be executed on the second terminal server.

9. The system according to claim 6, wherein termination of the application on the first terminal server is triggered by the host server;

the termination process includes a save call from the application with respect to saving one or more of the application files opened by the client; and the first terminal server automatically programmatically responds to the save call such that the one or more of the application files opened by the client are automatically saved.

10. The system according to claim 6, further comprising a performance analyzer coupled to the host server and a network to which the first terminal server and the second terminal server are connected; wherein the application is one of a plurality of applications;

the performance analyzer collects data relating to the network, the number and nature of applications already running on the first terminal server and the number and nature of applications already running on the second terminal server; and the performance analyzer determines at least one of the first terminal server and the second terminal server.

11. A non-transitory computer-readable medium having instructions stored thereon that, when executed by processing device cause the processing device to:
receive, by a host server providing a remote desktop environment to a client device, a first request from the client device to execute an application;
select, from a plurality of terminal servers, a first terminal server to execute the application;
initiate execution of the application on the first terminal server;
determine that the application is to be transferred to a second terminal server of the plurality of terminal servers;
determine identifiers of storage locations of one or more application files that are opened by a user of the client device in relation to the application;
cause execution of the application on the first terminal server to be terminated; and
initiate execution of the application on the second terminal server using the identifiers of the storage locations of the one or more application files; wherein
to cause execution of the application on the first terminal server to be terminated the instructions are further to cause the processing device to:
send a close request to close the application on the first terminal server;
detect a save request to save a file from the one or more application files;
determine a window associated with the save request; and
accept the save request to save the file from the one or more application files by programmatically responding to the window associated with the save request; and
to initiate execution of the application on the second terminal server the instructions are further to cause the processing device to:
send an invite to the user of the client device, wherein the invite is to resume the application on the second terminal server;
receive an acceptance response from the user to execute the application on the second terminal server; and
send a second execution request to the second terminal server, wherein the second execution request comprises, as parameters, the identifiers of the storage locations of the one or more application files.

12. The non-transitory computer-readable medium of claim 11, wherein
the application is one of a plurality of applications; and
the instructions further cause the host server to determine that:
the application is one of a first subset of the plurality of applications which are to be executed on the second terminal server; and
that a second subset of the applications are to be executed on the first terminal server.

13. The non-transitory computer-readable medium of claim 11, further comprising additional instructions when executed cause a performance analyzer to:
collect data relating to the network, the number and nature of applications already running on the first terminal server and the number and nature of applications already running on the second terminal server; and
determine a first subset of a plurality of applications which are to be executed on the first terminal server and a second subset of the plurality of applications which are to be executed on the second terminal server; wherein
the performance analyzer is coupled to the host server and a network to which the first terminal server and the second terminal server are connected; and
the application is one of the plurality of applications.

14. The non-transitory computer-readable medium of claim 11, wherein
termination of the application on the first terminal server is triggered by the host server; and
the termination process includes a save call from the application with respect to saving one or more of the application files opened by the client; and
the instructions configure the first terminal server to automatically programmatically respond to the save call such that the one or more of the application files opened by the client are automatically saved.

15. The non-transitory computer-readable medium of claim 11, further comprising additional instructions when executed cause a performance analyzer to:
collect data relating to the network, the number and nature of applications already running on the first terminal server and the number and nature of applications already running on the second terminal server; and
determine at least one of the first terminal server and the second terminal server; wherein
the performance analyzer is coupled to the host server and a network to which the first terminal server and the second terminal server are connected; and
the application is one of the plurality of applications.

* * * * *